United States Patent [19]

Feiner et al.

[11] 3,795,776

[45] Mar. 5, 1974

[54] COMBINED PBX AND KEY TELEPHONE ARRANGEMENT

[75] Inventors: Alexander Feiner, Rumson; Allan Martyn Gerrish, Little Silver, both of N.J.

[73] Assignee: Bell Telephone Laboratories, Incorporated, Murray Hill, N.J.

[22] Filed: Aug. 23, 1972

[21] Appl. No.: 282,921

[52] U.S. Cl. .............................. 179/99, 179/18 AD

[51] Int. Cl. .............................. H04m 3/02

[58] Field of Search ............ 179/99, 18 AD, 27 CA

[56] References Cited

UNITED STATES PATENTS

| | | | |
|---|---|---|---|
| 3,436,488 | 4/1969 | Barbato et al. | 179/99 |
| 3,647,983 | 3/1972 | Fitzsimons et al. | 179/99 |
| 3,283,083 | 10/1966 | MacLeod | 179/99 |
| 3,239,610 | 3/1966 | Morse et al. | 179/99 |

*Primary Examiner*—Kathleen H. Claffy
*Assistant Examiner*—Mitchell Saffian
*Attorney, Agent, or Firm*—David L. Tannenbaum

[57] ABSTRACT

In key telephone arrangements it is standard procedure to provide a key telephone line circuit as a buffer between the private branch exchange (PBX) and the stations. The purpose of the circuit is to forward ringing signals, to generate lamp signals, and to provide the hold function for the associated station. By arranging each PBX trunk with a hold bridge and with a lamp signal generator and distributor, the key telephone line circuit has been eliminated. The lamp flash rate indicative of a calling connection and the lamp wink rate associated with a connetion on hold are generated on the trunk side of the PBX switching network and transmitted through the network to the associated station over the audio pair. The PBX switching network controller, in response to signals from a key station, functions to enable the hold bridge in any trunk circuit associated with that station.

17 Claims, 3 Drawing Figures

PATENTED MAR 5 1974 3,795,776

SHEET 1 OF 3

COMBINED PBX AND KEY TELEPHONE ARRANGEMENT

BACKGROUND OF THE INVENTION

This invention relates to an improved arrangement for providing service to key telephone stations and, more particularly, to an arrangement for providing such service at a lower per line equipment cost.

While endeavoring to make communication more convenient and flexible, telephone systems have evolved to serve a multitude of diverse needs. Private branch exchange (PBX) systems have been developed to serve users, such as businesses where there is a large community of interest between a number of stations at a single location. Typically, the equipment for controlling the PBX system is located on the subscriber's premises.

Key telephone systems have been developed to operate in conjunction with the PBX equipment to provide services, such as multiple line pickup and intercommunication, to certain of the stations. These key telephone systems are in essence line circuits for distributing supervisory signals, such as ringing and lamp indications to the stations associated with a given line. Thus, for every line (telephone number) answerable from the key telephone system a separate line circuit is provided.

Constant attention has been given over the years to minimize the cost of these line circuits which are known as 400D KTU's in the industry. An example of a recent advance in the art of key telephone line circuits is the U.S. Pat. No. 3,436,488 issued to R. E. Barbato and D. T. Davis on Apr. 1, 1969. Estimations are that well over one million circuits similar to the Barbatos et al. circuit are manufactured each year, and approximately one-half of those are used for providing PBX key telephone service. Thus, any reduction in material or manufacturing cost is substantial and of great significance.

Accordingly, it would be advantageous to arrange a key telephone system, with all of the features of present key telephone systems, in a manner to reduce the per line cost as much as possible and particularly in a manner to eliminate completely the necessity for the key telephone line circuits.

SUMMARY OF THE INVENTION

An analyzation of the services provided to a key telephone station revealed to us that there are certain services, such as lamp and ringing controls, which are only necessarily associated with the station when communication is directed to or from that station or, in other words, when the station is active. For example, when the station is on-hook and not in the process of being signaled, there is no need to provide the station with lamp signaling control or with ringing control, or with hol control. In present key telephone arrangements all of these services are provided by the key line circuit and are thus on a dedicated per line basis. Accordingly, when a line is not in use, the control circuitry associated with that line is idle.

We have found that the key telephone system line circuit can be eliminated by rearranging and combining the PBX and key telephone systems so that certain of the circuitry which controls the communication-only services is moved from the station side of the PBX switching network to the private branch exchange (PBX) or trunk side of the network. Under this arrangement, since there are always less trunks than answerable lines, less control equipment is required.

We have found that by making the hold bridge part of the trunk and by controlling the lamp wink rates associated with the hold feature and the lamp flash rates associated with a ringing connection from the trunk, the resulting PBX line circuit can be greatly simplified.

We have found also that if the A lead from each key station is arranged to control the PBX directly, as opposed to the present arrangement where signals on the A lead are converted to signals on the tip and ring communication leads, it is possible to reduce the PBX circuitry necessary to detect the tip and ring signals. When this is done, the flexibility of the overall system is enhanced at lower cost since the A lead signals can be matched against the actual communication signals on the tip and ring for control purposes.

In one embodiment of the invention, the resulting PBX line circuit consists of a single line relay operable under control of the PBX switching network. When the relay is operated, voltage is applied to the line lamp at the associated station and the light is illuminated to indicate an active communication condition of the line. By recognizing that during any other condition of the station, i.e., on hold, on-hook, or ringing, the station handset is disconnected from the network tip and ring leads, we have devised an arrangement for supplying the ringing voltage and the lamp signaling voltage over these leads from the PBX trunk.

By also recognizing that when the hold key is depressed a delay occurs between the time the resulting signal (an open condition on the A lead) is detected and the time when the tip and ring leads are opened, we have devised an arrangement for providing hold control in the associated trunk. The delay period is detected and a hold bridge in the trunk is placed across the tip and ring leads back to the central office (CO), or PBX.

When the A lead is opened on a hold condition, the line relay associated with the station is released and the steady lamp voltage is removed. The trunk circuit is arranged to apply the wink rate voltage through the PBX switching network thereby causing the line lamp at that station to wink as a signal to the subscriber that the station is on hold.

On an incoming call, ringing is directed through the PBX trunk and over the R lead of the audio pair through the network and over the RC lead to the station. Concurrently therewith, the lamp flash rate is transmitted from the trunk through the network over the T lead and then over the L lead to the station.

With our arrangement of equipment, it is possible to reduce the PBX and key telephone system line circuitry to a minimum, thereby effecting great savings in manufacturing cost.

Accordingly, it is a feature of our invention to arrange a combined PBX and key telephone system in a manner eliminating the key telephone line circuit and simplifying the PBX line circuit.

It is another feature of our invention that the distinctive signaling necessarily provided to key telephone stations is controlled in part directly from the PBX trunk circuit.

It is another feature of our invention that the hold bridge of a key telephone station is arranged in the PBX trunk and is operative in response to control signals obtained from the station to which the trunk is connected.

It is still another feature of our invention to provide a key telephone system wherein the A lead signals are communicated directly to the PBX switching network without converting those signals to tip and ring lead signals to the PBX switching network.

DESCRIPTION OF THE DRAWING

These and other objects, features and advantages of our invention will be more fully apparent from the following description of the drawing in which.

Figure 1:
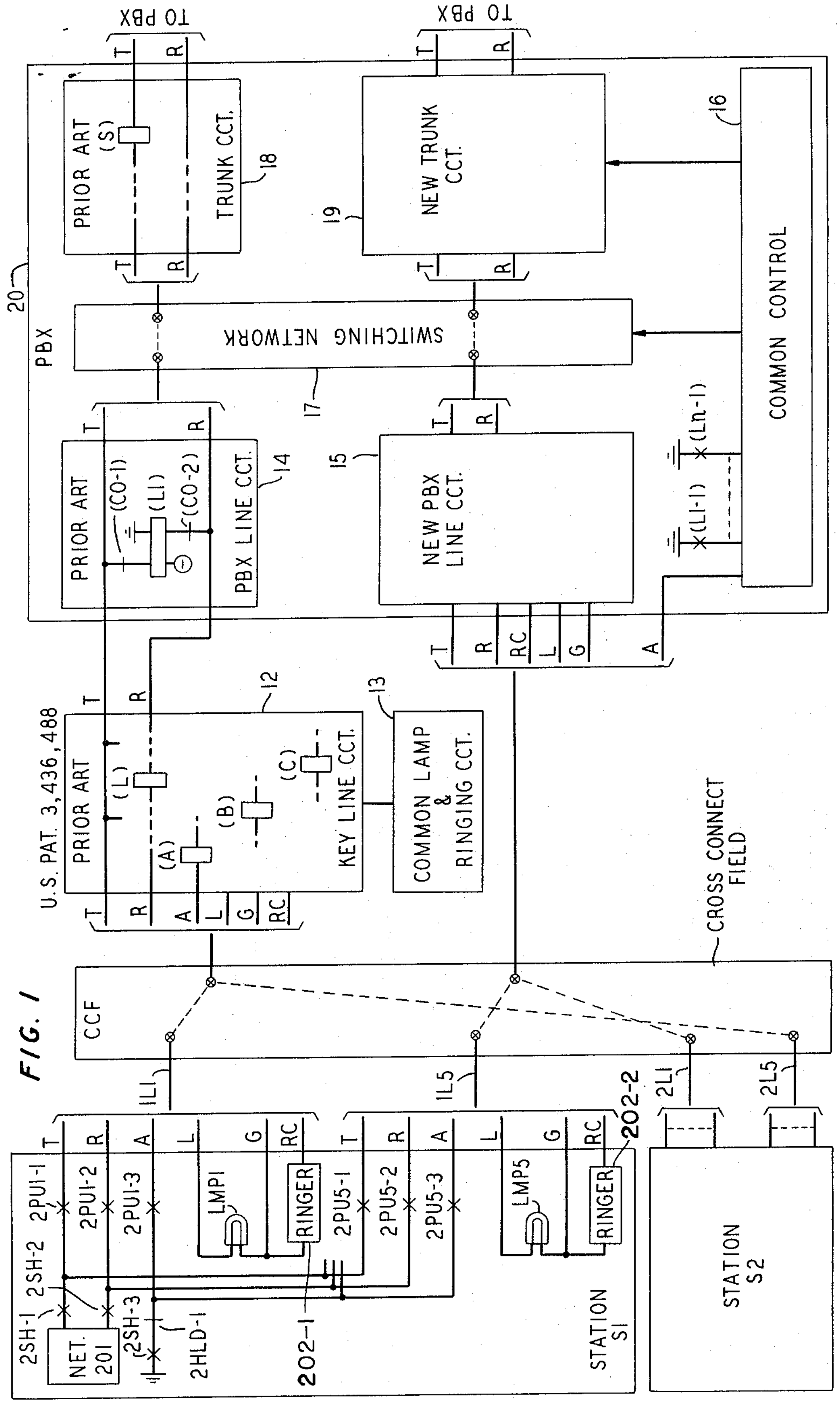
FIG. 1 is a schematic showing both the prior art and the new key telephone system circuit arrangements.
Figure 2:
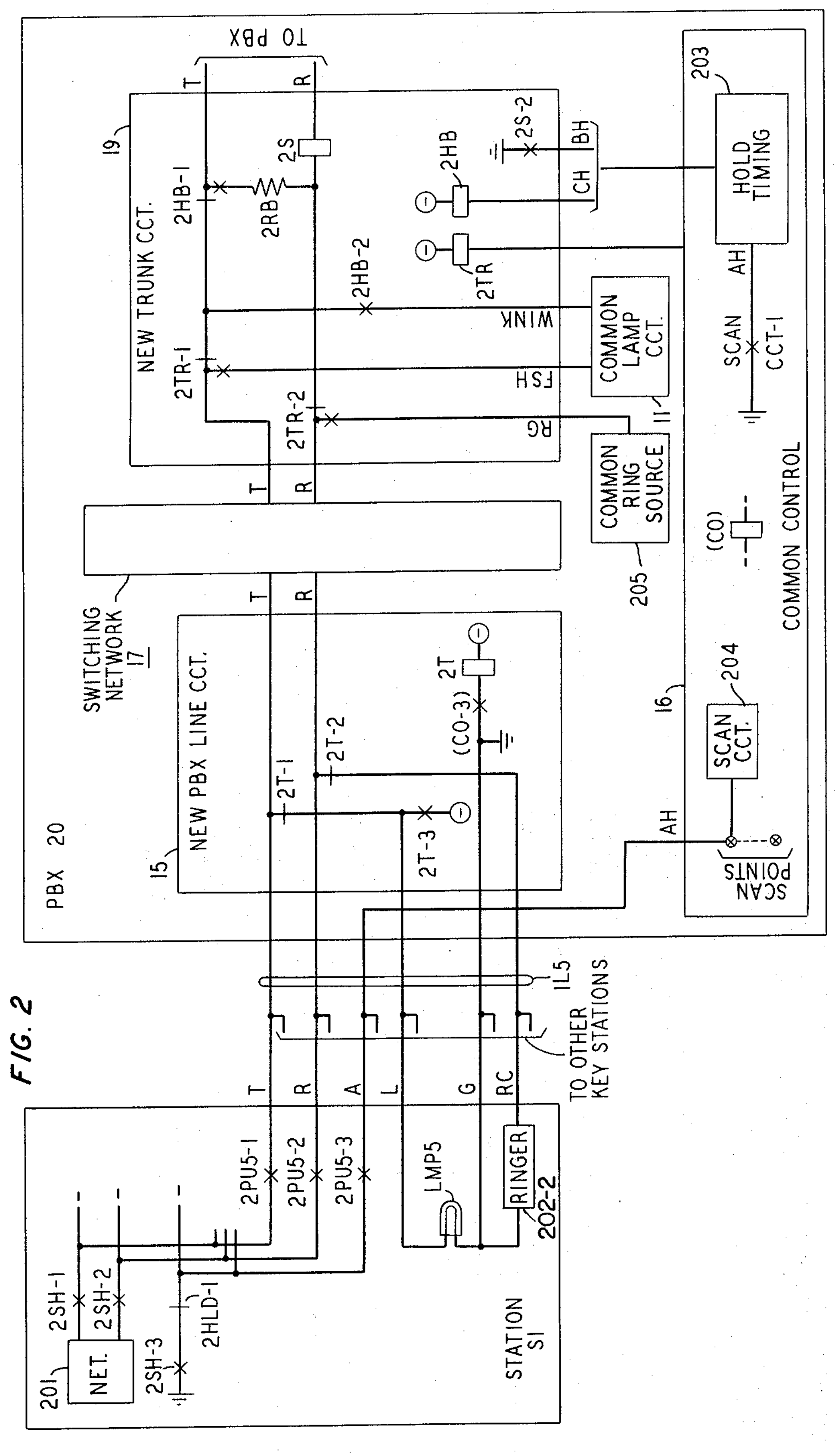
FIG. 2 is a more detailed schematic of a new key telephone system arrangement utilizing our invention.
Figure 3:
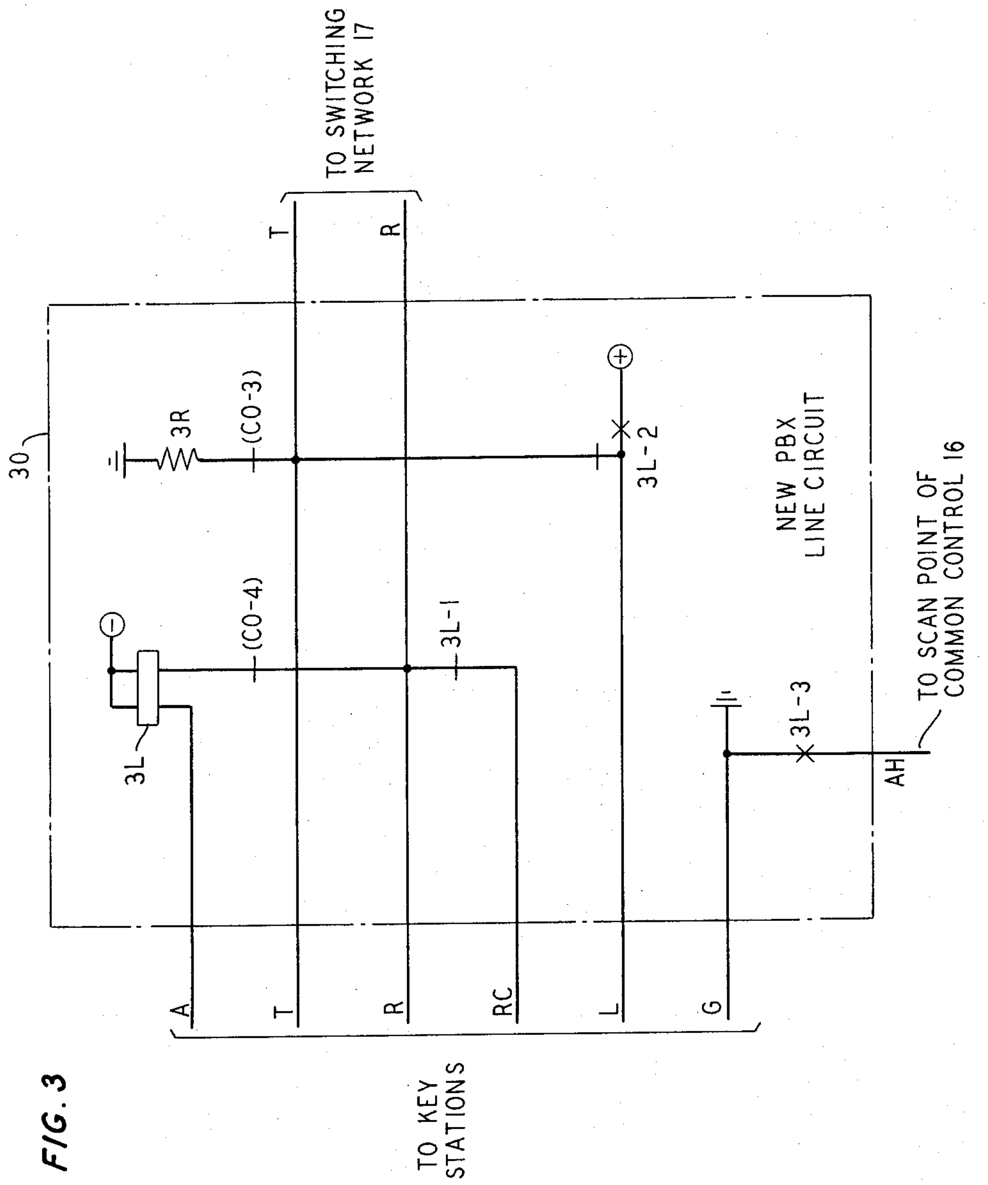
FIG. 3 is a detailed schematic of an alternate embodiment of a PBX line circuit also utilizing our invention.

It will be noted that FIG. 1, 2 and 3 employ a type of notation referred to as "detached contact" in which an "X" shown intersecting a conductor represents a normally open contact of a relay and a bar shown intersecting a conductor at right angles represents a normally closed contact of a relay; "normally" referring to the unoperated condition of the relay. The principles of this type of notation are described in an article entitled "An Improved Detached Contact Type Schematic Circuit Drawing" by F. T. Meyer in the Sept. 1955 publication of the American Institute of the Electrical Engineers Transactions, Communications and Electronics, Vol. 74, pages 505–513.

It will be noted that certain equipment has been shown enclosed in parentheses in FIG. 1. Equipment thus shown is shown in more detail in prior art telephone systems.

INTRODUCTION

Prior to beginning a discussion of the operation of our arrangements, it would be well to review the operation of a typical prior art key telephone system operating in conjunction with a PBX system. Accordingly, with respect to FIG. 1, on an incoming call the directory number of the station to which the call is directed is received from trunk circuit 18 and communicated to common control circuit 16 of PBX 20. Under control of common control circuit 16 a path is established through PBX switching network 17 to the key telephone line circuit, such as key line circuit 12, associated with the called line number. Ringing is then transmitted from the trunk over the R lead of the T and R communication leads and the PBX switching network 17 to the connected key telephone line circuit.

Key line circuit 12, which line circuit is associated with line 1L1 of station S1 and with line 2L5 of station S2, is arranged typically as shown in the beforementioned Barbato et al. United States patent such that when ringing is applied on the input R lead, a ringing detector circuit in the key line circuit is enabled. The key line circuit thereupon directs ringing potential from common lamp and ringing circuit 13 to the associated station over the RC lead.

The output leads T, R, A, L, G and RC from key line circuit 12 are connected through cross-connect field CCF to all of the stations and to all of the keys at those stations associated with the same directory number.

Thus, as shown in FIG. 1, key line circuit 12 is associated with pickup key 2PU1 of station S1 (line 1L1) and with pickup key 2PU5 (not shown on FIG. 1) of station S2 (line 2L5). When ringing is detected by key line circuit 12, potential is applied over lead RC to the ringers of all of the stations associated with the calling line as an indication that a call is incoming to the associated station.

In addition, key line circuit 12 applies flashing potential via the L lead to the connected stations as an indication as to which line key must be depressed at each station for communication with the calling line. Thus, at station S1, lamp LMP1 flashes and, at station S2, lamp LMP5 (not shown) flashes. When the proper pickup key is depressed at station S1, network 201 becomes connected across the T and R communication leads. LEADS. At the same time a ground is supplied from the communicating station over the A lead to the key line circuit. The (A) relay in the key line circuit thereupon operates and ringing is tripped in the well-known manner. A communication path is then established between network 201 of a called station and the calling subscriber via the CO, or PBX.

When such a connection is established, key line circuit 12 operates to provide potential on the L lead to light in a steady continuous manner the line lamp associated with the called line. The steady lamp signal is interpreted by the subscriber as indicating that an active communication status exists with respect to the associated line.

If the subscriber at station S1 desires to place the connection on hold, hold key 2HLD is depressed thereby removing ground from the A lead and causing the (A) relay in key line circuit 12 to release. Key line circuit 12 then responds to the release of the (A) relay and the continued operation of the (L) relay by placing a hold bridge across the T and R leads back to the PBX line circuit 14. Concurrently therewith, flashing potential is applied to the L lead from key line circuit 12 so that the line lamp associated with the line on hold flashes in a distinctive manner, informing the subscriber of the inactive communication status of the associated line.

It should be noted that all supervisory communication between station S1 and common control 16 of PBX 20 is via the line relay (LI) of the PBX line circuit 14. When line relay (L1) is operated, a signal is applied to common control 16 via contact (L1-1). Historically, this occurs since PBX 20 is arranged for operation with a single telephone station and thus the T and R leads from PBX line circuit 14 would normally be extended directly to the associated station. No provision has been made in the past for A lead control of the PBX. Thus, for key operation, key line circuit 12 is inserted between PBX ine circuit 14 and station S1 for signaling control purposes. Accordingly, in prior arrangements supervisory control signals from the station on the A lead are converted to signals on the T and R leads and these A lead signals are never communicated directly to the PBX.

The (L1) relay of PBX line circuit 14 functions from line current which flows when network 201 is placed across the T and R leads. Common control 16, upon the enabling of the (LI) relay, receives a ground or other signal via enabled make contact (1-1) and a path is established through switching network 17 to an available trunk circuit. When common control circuit 16 establishes the connection, contacts Co)-1 and C0-2) operate, thereby removing relay (L1) from the circuit.

DETAILED DESCRIPTION

Turning now to FIG. 2, the operation of our invention will now be discussed in detail, keeping in mind that the key line circuit 12 is no longer in the circuit between PBX 20 and key station S1 and that prior art PBX line circuit 14 has been replaced by a new PBX line circuit 15. In addition, prior art trunk circuit 18 has been replaced by a new trunk circuit 19.

INCOMING CONNECTION

When a connection is directed from the CO to a directory number, common control 16 establishes a connection through switching network 17 from the associated trunk circuit, such as trunk circuit 19, to the PBX line circuit associated with the called number, such as PBX Line circuit 15. PBX line circuit 15 is connected through the cross-connect field, as shown in FIG. 1, to line 1L5 and pickup key 2PU5 of station S1.

Upon the establishment of a connection through switching network 17, common control circuit 16 causes relay 2TR in trunk circuit 19 to operate, thereby causing ringing potential from common ring source 205 to be applied to the R lead via enabled transfer contact 2TR-2. This potential is extended to switching network 17 and to the R lead of PBX line circuit 15 and via released break contact 2T-2 and the RC lead to station S1. Thus, the ringing potential from the trunk is extended through the PBX line circuit to ringer 202-2 at the called station.

Concurrently therewith, flashing lamp potential is extended from PBX 20 common lamp circuit 11 to trunk circuit 19 and via enabled transfer contact 2TR-1 of trunk circuit 19 and over the T lead through switching network 17 to PBX line circuit 15 and via released break contact 2T-1 and over the L lead to station S1 thereby flashing line 1L5 line lamp LMP5 associated with the called line.

When station S1 goes off-hook in response to the incoming call, the low impedance across the T and R leads at the station trips ringing in the well-known manner. In addition, ground is extended via enabled make switchhook contact 2SH-3, released break hold key contact 2HLD-1 and via enabled line pickup key contact 2PU5-3 and over the A lead to PBX 20 scanner circuit 204 of common control 16. Upon detection of the ground, scanner circuit 204 enables the (CO) relay associated with the calling line; in this case, the (CO) relay controlling PBX line circuit 15. Accordingly, relay 2T in PBX line circuit 15 operates when the associated station S1 goes off-hook on line 1L5. In addition, relay 2TR in trunk circuit 19 is released.

It should be noted that the A lead operation just described differs from prior art A lead operations in that scanner circuit 204 in common control 16 is directly controlled from signals on the A lead as opposed to indirect T and R lead control in the manner previously discussed.

When relay 2T operates, potential is applied via enabled make contact 2T-3 from PBX line circuit 15 over the L lead to light, in a steady manner, line 1L5 lamp LMP5.

Network 201 from station S1 is extended via enabled make switchhook contacts 2SH-1 and 2SH-2 and enabled pickup key contacts 2PU5-1 and 2PU5-2 over the T and R leads to PBX line circuit 15 and over the T AND R leads through switching network 17 to trunk circuit 19. Relay 2S in trunk circuit 19 operates at this time from line current, thereby completing the communication connection from station S1 through trunk circuit 19 via release break contacts 2TR-1 and 2TR-2, and released break contact 2HB-1 and over the T and R leads to the CO, or PBX.

Once relay 2S operates, loop current via network 201 maintains that relay operated. Flashing potential from common lamp circuit 11 is removed from the R lead via released make contact 2TR-1 and communication can take place between network 201 of station S1 and the calling subscriber via the PBX in the routine manner.

HOLD CONDITION

When station S1 desires to place a connection on hold, the hold key at station S1 is operated, thereby removing ground from A lead via enabled hold key contact 2HLD1. Accordingly, scanner circuit 204 detects the absence of ground from the A lead of line 1L5 associated with station S1.

When the hold key is operated at a key telephone station, the ground is removed from the A lead. When the hold key is released, the enabled pickup key also releases in the well-known manner. Thus, when a call is placed on hold, ground is always removed from the A lead prior to the disconnection of network 201 from the T and R leads. We have taken advantage of that fact by arranging hold timing circuit 203 in a manner to time the difference between the detection by scanner circuit 204 of the removal of ground from the A lead and the release of relay 2S in trunk circuit 19.

Hold timing circuit 203 is arranged in any one of a number of well-known circuit configurations operable for comparing a potential on the AH input with a potential on the BH input and for timing the period between the respective removals of these potentials. Thus, if the ground on input AH is removed (ground on A lead from station S1) 50 milliseconds before the removal of ground from input BH (release of the 2S relay in the associated trunk), a potential is extended over lead CH to operate relay 2HB in the associated trunk circuit.

At this point it should be noted that if station S1 were going on-hook, as opposed to going on hold, network 201 would be removed from the T and R leads prior to or concurrent with the removal of the ground from the A lead and relay 2S in trunk circuit 19 would release substantially at the same time as the detected removal of ground by scanner circuit 204. Thus, hold timing circuit 203 would function to prevent relay 2HB in trunk circuit 19 from operating.

Returning now to the situation where a hold condition is initiated, relay 2HB operates in the associated trunk circuit thereby connecting a hold bridge across the T and R leads. In the trunk circuit shown, the hold bridge consists of resistor 2RB and is controlled by enabled make contact 2HB-1. Simultaneously, common control 16 releases relay (CO) and consequently relay 2T in PBX line circuit 15 also releases.

Common lamp circuit 11 provides distinctive hold flashing or, as commonly called, winking potential on lead WINK and via enabled make contacts 2HB-2 and the T lead through switching network 17 to PBX line circuit 15. The wink rate potential on lead T is then extended via released break contact 2T-1. in PBX line circuit 15 and over lead L to station S1 to pulse line lamp LMP5 in a distinctive manner indicative of a hold condition on the associated line.

When station S1 goes from the hold condition to the operative condition, ground is reapplied to the A lead via enabled switchhook contact 2SH-3 and released break contact 2HLD-1 and the reenabled pickup key make contact 2PU5-3. This ground is extended to scanner circuit 204 in common control 16. In response thereto, hold timing circuit 203 functions to release relay 2HB in trunk circuit 19. The wink rate lamp signal is then removed from the T lead via now released make contact 2HB-2 in trunk circuit 19 and the hold bridge is removed from the T AND R leads via released transfer contact 2HB-1. Accordingly, the connection is reestablished from the trunk circuit 19 and through PBX line circuit 15 and now reenabled relay contacts 2T-1 and 2T-2 to station S1.

When station S1 goes on-hook at the conclusion of the conversation, network 201 is removed from the T and R leads under control of released switchhook contacts 2SH-1 and 2SH-2 thereby causing relay 2S in trunk circuit 19 to release. As discussed previously, since relay 2S releases substantially at the same time as the removal of ground from the A lead, hold timing circuit 203 prevents relay 2HB from operating at this time. Thus, the hold bridge is not connected across the T and R leads of the CO and consequently trunk circuit 19 is returned to the idle condition. PBX line circuit 15 is returned to the idle condition by the release of the (CO) relay associated therewith. Station S1 is then free for the establishment of connections thereto, be it PBX line circuit 15 or any of the PBX line circuits associated with pickup keys at station S1 via connections established through switching network 17.

Returning to FIG. 1, it will be evident now that, by a slight modification to the CO trunk circuit and with a rearrangement of the PBX line circuit, the prior art key line circuit has been removed from the connection between the PBX switching machine and the key telephone stations, and equipment such as the hold bridge has been reduced from a per line basis to a per trunk basis. FIG. 3 shows an alternate embodiment of our new PBX line circuit. The new PBX line circuit 30 may be characterized as a universal circuit in that it may be used in conjunction with a key telephone station, or, alternatively, in conjunction with a regular telephone station. The universal nature of the circuit is accomplished by use of the 3L relay, which is a dual winding relay operated either from ground on the A lead from a key telepone station or from loop current flowing through the network over the T and R leads. In addition, the new PBX line circuit 30 is arranged to provide battery feed to the station immediately upon the station going off-hook.

One important aspect of new PBX line circuit 30 is the fact that the scan point detector can be controlled by a relay, such as is represented by relay 3L, which is at one time operative from T and R lead signals and at another time operative from A lead signals. Thus, the scan point detector control relay serves the dual purpose of monitoring the transmission path as well as the A lead signaling path.

When a key telephone station subscriber goes off-hook, ground is supplied via the 3R resistor and released break contact (CO-3) and the T lead to the station through the station network (not shown) and back over the R lead and via released break contact (CO-4) and through one winding of the 3L line relay. Operation of the 3L relay causes ground to be supplied via enabled make contact 3L-3 over lead AH to the associated scan point of common control 16. Thus, in the manner previously described, relay (CO) operates in common control 16 and thereby removes the operate winding of the 3L relay from the loop circuit. However, at this point ground is supplied from the key station to the other winding of the 3L relay, maintaining that relay operated. Positive lamp potential is supplied over enabled transfer contact 3L-2 and the L lead of the key telephone station.

It should be noted that new PBX line circuit 30 is arranged to provide lamp and ringing signals from the trunk circuit over the T and R leads and over leads RC and L when the 3L relay is normal and thus this circuit operates similar to the new PBX line circuit 15 previously described.

When new PBX line circuit 30 is utilized with a non-key telephone station, the 3L relay operates from loop current on the T and R leads as previously described, thereby signaling common control 16. When the (CO) relay operates, control of the circuit is transferred from the new PBX line circuit 30 to the associated trunk circuit and the supervisory relay therein, all in a straightforward fashion.

A review of the new PBX line circuit 15 or the new PBX line circuit 30 will reveal to those skilled in the art numerous additional modifications which can be made to even further simplify the line circuit so as to perform in the manner described herein. Thus, since one aspect of the PBX line circuit is the distribution of ringing and lamp signals transmitted from the incoming T and R leads to the respective RC and L leads of the associated key telephone station, diodes or other circuit isolation devices may also be employed advantageously. It will of course be obvious to one skilled in the art that contacts of an electromechanical switching network, for example, the off-normal crossbar switch contacts, could be used in place of the 2T relay and the 2T relay contacts shown in new PBX line circuit 15. Such an arrangement could simplify even further the new PBX line circuit. Also, the new PBX line circuit could be split such that a portion of the line circuit would be in the PBX and a portion of the line circuit distributed along the path between the PBX and a key station, either working autonomously or under remote control with respect to the PBX, without violating the spirit or scope of this invention.

What is claimed is:

1. A line circuit for use in a combined PBX and key telephone system wherein communication connections may be directed from any one of a number of trunk circuits to any one of a number of stations over a said line circuit associated with said stations and wherein communication connections may be directed from any one of a number of stations to any one of a number of said trunk circuits, and wherein said line circuit may be connected with any number of said stations, and wherein each of said stations may be connected with any number of said line circuits, and wherein line lamps at each of said stations are associated with individual ones of said line circuits, said line circuit comprising:

means including communication leads for establishing a communication connection between said line circuit and an associated one of said stations, means for extending a voltage potential over a signal lead to each station connected to said line circuit to light said associated line lamp at each said connected station in a steady manner to indicate that said line circuit is serving an off-hook communication connection, and means for extending pulsating voltage potentials received over one of said communication leads from a connected one of said trunk circuits to each said connected station over said signal lead to light said associated line lamp in a pulsating manner to indicate a noncommunication active condition with respect to said line.

2. The invention set forth in claim 1 further comprising means for extending ringing voltage potentials received over one of said communication leads from a connected one of said trunk circuits to each said connected station over a ringing signal lead to each said connected station to enable a ringer at each said station.

3. The invention set forth in claim 2 wherein said communication connection establishing means includes a relay, said voltage extending means includes one contact of said relay, said pulsating voltage extending means includes a second contact of said relay, and said ringing voltage extending means includes a third contact of said relay.

4. The invention set forth in claim 3 wherein said relay is operative in response to signals communicated thereto exclusively from said PBX.

5. The invention set forth in claim 3 wherein said relay is operative in response to signals communicated thereto exclusively from each said connected station.

6. In combination, in a telephone system a plurality of telephone stations, a plurality of trunk circuits less in number than the number of telephone stations, a plurality of line circuits equal in number to the number of different lines to which communication connections may be directed from said trunk circuits, a switching network operable for establishing communication connections between any one of said trunk circuits and any one of said line circuits, means in each said telephone station for associating said telephone station with certain ones of a number of said line circuits, means in each said telephone station for visually indicating the status of each line circuit associated therewith, means in each said trunk circuit operable for transmitting over an established communication connection first and second signals for operating said visual means, said first signals representing ringing status signals and said second signals representing hold status signals, and means responsive to a calling connection directed from one of said trunk circuits to a particular one of said line circuits for enabling said first signal transmitting means over an established connection to said line circuit so as to provide visual indications of a ringing status at all telephone stations associated with said line circuit.

7. The invention set forth in claim 6 further comprising means at each station for audibly indicating the ringing status of said station, and means in each said trunk circuit operable upon receipt of ringing potentials for extending said potentials over said established communication connection to a connected line circuit so as to provide audible indications of a ringing status at all telephone stations associated with said line circuit.

8. The invention set forth in claim 7 further comprising means in each of said telephone stations operable for providing an off-hook answering signal for each line associated therewith, means in each said line circuit operable for providing signals for operating said visual means of said associated stations in a manner indicating a communicating status of said associated line, means responsive to an off-hook answering signal from a particular one of said stations on a line associated with said calling connection directed to said particular line circuit for inhibiting said trunk first signal transmitting means, and means concurrently operable with said last-mentioned means for enabling said line circuit visual indicating means.

9. The invention set forth in claim 8 further comprising means in each said trunk circuit operable for establishing a hold condition with respect to said trunk circuit, means in each of said telephone stations operable for providing a hold signal for any line communicating therewith, means responsive to a hold signal from said particular one of said stations for enabling said hold condition establishing means in said one trunk circuit connected therewith, and means concurrently operable with said last-mentioned means for inhibiting said line circuit visual indicating means and for enabling said second signal transmitting means of said one trunk over an established connection to said line circuit so as to provide visual indications of a hold status at all said stations associated with said line circuit.

10. The invention set forth in claim 9 wherein said telephone station associating means and said telephone station hold signal means includes means for providing signals on an associated A lead, means associated with said switching network means for detecting signal changes with respect to each said A lead, and means operable in response to detected changes in signals on a particular A lead for controlling said line circuit associated therewith and for controlling any trunk circuit associated therewith.

11. The invention set forth in claim 10 further comprising means for detecting the termination of a communication connection by a telephone station, means for timing a said detected termination with respect to a detected hold signal on an associated A lead, and means responsive to a certain timed relationship for enabling said hold means in said trunk circuit.

12. A telephone system comprising a plurality of telephone stations, each station having at least one self-locking pickup key operable for connecting the transmitter and receiver of said station to transmission leads associated with said station, said pickup key further operable for transmitting a signal over a first signal lead, each said station further having a nonlocking hold enabling key, said hold enabling key arranged for releasing any operated pickup key upon being depressed, said hold enabling key further operable for inhibiting said signal over said first signal lead, a plurality of trunk circuits, each trunk circuit including hold means, a switching network for establishing connections between any said trunk and any said telephone station, means for controlling said switching network, said control means including means for detecting the continued establishment of a communication connection from one of said trunk circuits to the transmitter and receiver of one of said telephone stations, means for detecting the absence of a signal on said first signal lead, and means responsive to a detected continued communication connection and to a detected absence of a signal on said first signal lead for enabling said trunk hold means.

13. The invention set forth in claim 12 wherein each said pickup key at each said station has associated therewith visual indicating means operable over a second signal lead for providing visual indications of the status of said transmission leads, a line circuit associated with said transmission leads of certain of said stations and interposed in a connection between said certain stations and said trunk circuit, means in said trunk circuit for transmitting over said transmission leads potentials for operating said visual indicating means, and means in said line circuit operable for removing any said transmitted visual indicating means operating potentials from said transmission leads and for extending said potentials to said telephone stations over said second signal lead.

14. The invention set forth in claim 12 wherein said control means further comprises means for detecting an initial connection of a station's transmitter and receiver to said transmission leads of said station and for detecting signals transmitted over said first signal lead of said station, and means responsive to a said detected initial connection for disassociating said detecting means from said transmission lead detection while still maintaining said detecting means operable with respect to said first signal lead detection.

15. A telephone system comprising a plurality of telephone stations, each station having at least one self-locking pickup key operable for connecting the transmitter and receiver of said station to transmission leads associated with said station, said pickup key further operable for transmitting a signal over a first signal lead, a plurality of trunk circuits, a switching network for establishing connections between any said trunk and any said telephone station, a line circuit associated with said transmission leads of certain of said stations and interposed in a connection between said certain stations and said trunk circuit, detecting means in said line circuit electrically connected to said station's transmission leads over a first path, said detecting means operable in response to an initial connection of an associated station's transmitter and receiver to said transmission leads for establishing a connection through said switching network to one of said trunk circuits, said detecting means further operable over a second path for detecting signals transmitted over said first signal lead for controlling said switching network, and means responsive to an enabling of said detecting means over said first path for electrically isolating said detecting means from said transmission leads while still maintaining said second path connection to said detecting means operable.

16. The invention set forth in claim 15 wherein said detecting means is a single relay.

17. The invention set forth in claim 15 wherein each said pickup key at each said station has associated therewith visual indicating means operable over a second signal lead for providing visual indications of the status of said transmission leads, and means in said trunk circuit for transmitting visual indicating means control signals to any said connected line circuit.

* * * * *